US006769212B2

(12) United States Patent
Grayson

(10) Patent No.: US 6,769,212 B2
(45) Date of Patent: Aug. 3, 2004

(54) FISH HANDLING TOOL AND WEIGH SCALE

(75) Inventor: Jeremy Grayson, Columbia, SC (US)

(73) Assignee: Normark Corporation, Minnetonka, MN (US)

(*) Notice: Subject to any disclaimer, the term of this patent is extended or adjusted under 35 U.S.C. 154(b) by 0 days.

(21) Appl. No.: 10/251,612

(22) Filed: Sep. 20, 2002

(65) Prior Publication Data

US 2004/0055203 A1 Mar. 25, 2004

(51) Int. Cl.[7] .............................................. A01K 97/00
(52) U.S. Cl. ................................................ 43/4; 4/53.5
(58) Field of Search .................. 43/4, 5, 53.5; 294/19.3; 7/106; 177/129, 148, 232, 233; 33/511; 73/862.474, 426

(56) References Cited

U.S. PATENT DOCUMENTS

| 406,546 A | 7/1889 | Taber |
| 452,278 A | 5/1891 | McIlvaine |
| 592,499 A | 10/1897 | Stephens |
| 1,568,808 A | 1/1926 | Davison |
| 1,580,416 A | 4/1926 | Cromwell |
| 2,533,230 A | 12/1950 | Dixon |
| 2,654,632 A | 10/1953 | Herbert |
| 3,521,396 A | 7/1970 | Allen |
| 3,978,605 A | * 9/1976 | Maruniak ........................ 43/5 |
| 5,119,585 A | * 6/1992 | Camp ........................ 43/53.5 |
| 6,438,891 B1 | * 8/2002 | Aboczky ..................... 43/53.5 |
| 6,560,913 B1 | * 5/2003 | Liao ................................ 43/5 |

FOREIGN PATENT DOCUMENTS

SE 0087624 10/1935

OTHER PUBLICATIONS

Berkley Big Game Lip Grip, Berkley 2002 Angler's Reference 2002 Berkley Fishing.

* cited by examiner

Primary Examiner—Kurt Rowan
(74) Attorney, Agent, or Firm—Dority & Manning, P.A.

(57) ABSTRACT

A tool for grasping and securing objects is provided. More specifically, while the present invention is not limited to use with fish, certain embodiments of the present invention provide a tool that allows the user to grasp and hold a fish. In addition, certain embodiments of the present invention also provide for the weighing of a fish or another object held by the tool. Spring biased jaws apply a force to objects being held and this force increases as the weight of the objects being held increases.

15 Claims, 8 Drawing Sheets

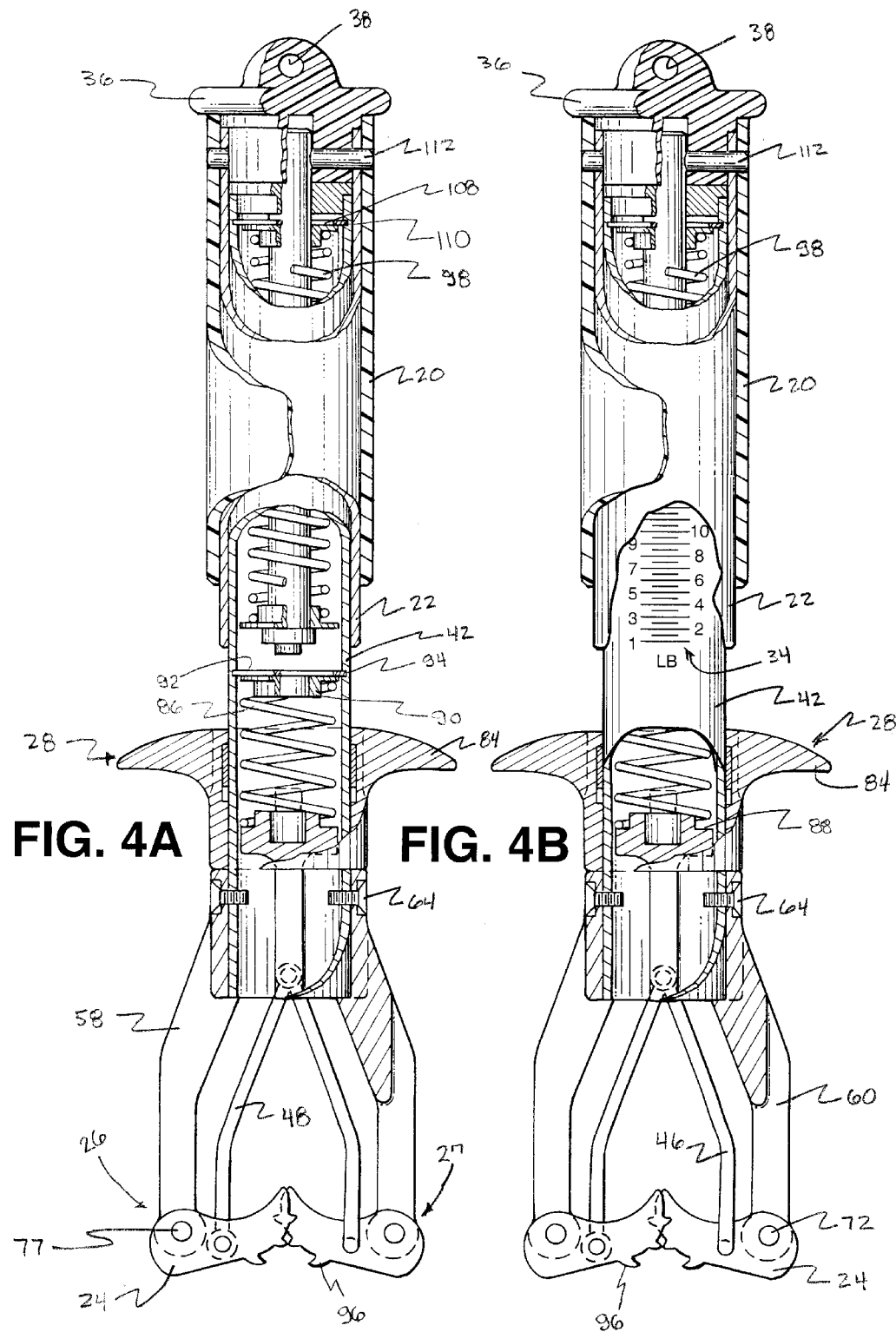

FISH HANDLING TOOL AND WEIGH SCALE

FIELD OF THE INVENTION

The present invention relates to a tool for grasping objects. More specifically, the present invention relates to a tool that may be used to grab and hold objects. While the present invention is not limited to use with fish, certain embodiments of the present invention provide a tool that allows the user to grasp and hold a fish. In addition, certain embodiments of the present invention also provide for the weighing of a fish or another object held by the tool.

BACKGROUND OF THE INVENTION

After setting the hook and reeling a catch to shore or the side of the boat, anglers generally need a way to secure fish for hook removal, identification, weighing, photographs, or otherwise. While fish are sometimes lifted from the water by jaws or the body, many fish species have sharp teeth located along the jaws or bony fins along their body that can be painful if contacted. Accordingly, a tool that assists with securing the fish once caught is desirable. Furthermore, as many anglers report the success of their catch by the weight of the fish, a tool that assists with securing the fish and that also provides for weighing the same is also desirable.

BRIEF SUMMARY OF THE INVENTION

Objects and advantages of the invention will be set forth in part in the following description, or may be obvious from the description, or may be learned through practice of the invention.

In one exemplary embodiment of the present invention, a housing is provided having an interior and an exterior, a first end and a second end. A pair of support arms are located at the first end of the housing and extend longitudinally away from the housing. Jaws are pivotally connected to the pair of support arms. A trigger is located upon the housing and is configured for longitudinal movement along the housing. An actuator is connected to the trigger and the jaws are configured such that upon causing the trigger to move away from the first end of the housing, the jaws open by pivoting towards the first end of the housing.

In certain embodiments, the tool may include a handle located proximate to the second end of the housing and configured for longitudinal movement along the exterior of the housing. A spring may be located within the interior of the housing, connected to the handle of the housing; the spring is configured to oppose the movement of the handle along the housing so as to provide for weighing of the objects grasped by the tool. In certain other embodiments, the jaws of the tool may each include teeth located along at least one edge to assist in securing an object between the jaws. Furthermore, one of the support arms may be configured to define a slot for the receipt of one of the jaws. Also, in certain embodiments, the housing defines a pair of slots located along the first end of the housing for guiding the longitudinal movement of the spring-biased trigger.

In another exemplary embodiment of the present invention, a tool for handling fish is provided having a cylinder that has a pair of slots formed at one end, and the cylinder defines an interior and an exterior. A frame is attached to the exterior of the cylinder and is located proximate the pair of slots, extending longitudinally from the cylinder. Jaws are pivotally connected to the frame and a trigger is located upon the cylinder and configured for guided movement along the pair of slots. A spring is located within the interior of the cylinder and is configured for urging the trigger along the pair of slots towards the frame. An actuator extends from the interior of the slotted end of the cylinder and is attached to the jaws and the trigger. The actuator is configured such that upon causing the trigger to move along the slots against the spring, the jaws are opened by pivoting towards the slotted and of the cylinder.

In still another exemplary embodiment of the present invention, a tool for grasping objects is provided that has an elongate main body having a first aperture and second aperture at the ends of the main body respectively. The main body defines a forked extension extending from around the first aperture. Cams are connected to the forked extension of the main body and are configured to rotate upon the forked extension towards or away from the first aperture. An activating member extends from the first aperture of the main body and is pivotally connected to the cams. A release element is located near the forked extension and is pivotally connected to the activating member and slidingly engaged with the main body. Upon sliding the release element along the main body away from the first aperture, the cams are rotated away from each other and towards the first aperture so as to open the tool for an object.

In still another exemplary embodiment of the present invention, a tool for holding objects is provided having a cylindrically-shaped main body defining an interior, exterior, and a first and second aperture located respectively at each end of the main body. The main body also defines a pair of arms that extend longitudinally and are located proximate the first aperture. Clamping jaws are connected to the ends of the pair of arms and are configured for moving about the point of connection to the pair of arms. Means are connected to the clamping jaws for selectively causing the clamping jaws to pivot about the point of connection to the arms so as to secure or release an object. A handle is located along the main body proximate to the second aperture. A spring is provided that has mechanical communication between the main body and the handle, and is biased against the movement of the handle away from the clamping jaws along the main body. Upon holding an object between the clamping jaws and suspending the tool by the handle, the handle is urged away from the clamping jaws and against the bias provided by the spring.

BRIEF DESCRIPTION OF THE DRAWINGS

FIGS. 4A through 4C illustrate partial cross-sectional views illustrating the operation of part of an exemplary embodiment of the present invention.

DETAILED DESCRIPTION

Figures 1A, 1B:
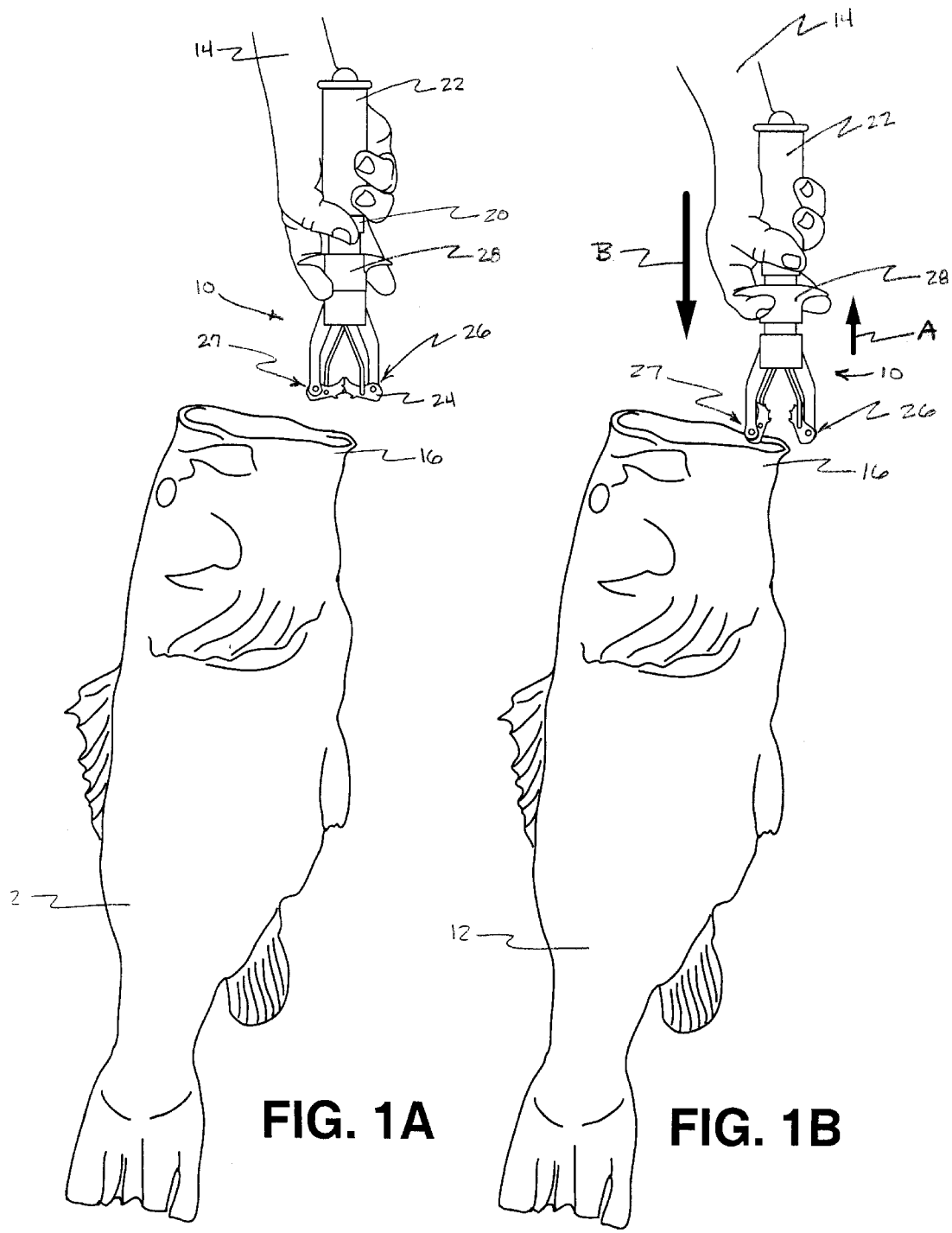
FIGS. 1A through 1C illustrate an application of an exemplary embodiment of the present invention.

Reference now will be made in detail to the embodiments of the invention, one or more examples of which are set forth in the drawings. Each example is provided by way of explanation of the invention, and not meant as a limitation of the invention. For example, features illustrated or described as part of one embodiment may be used with another embodiment to yield still a further embodiment. In fact, it will be apparent to those skilled in the art that various modifications and variations can be made in the present invention without departing from the scope or spirit of the invention.

Figure 1C:
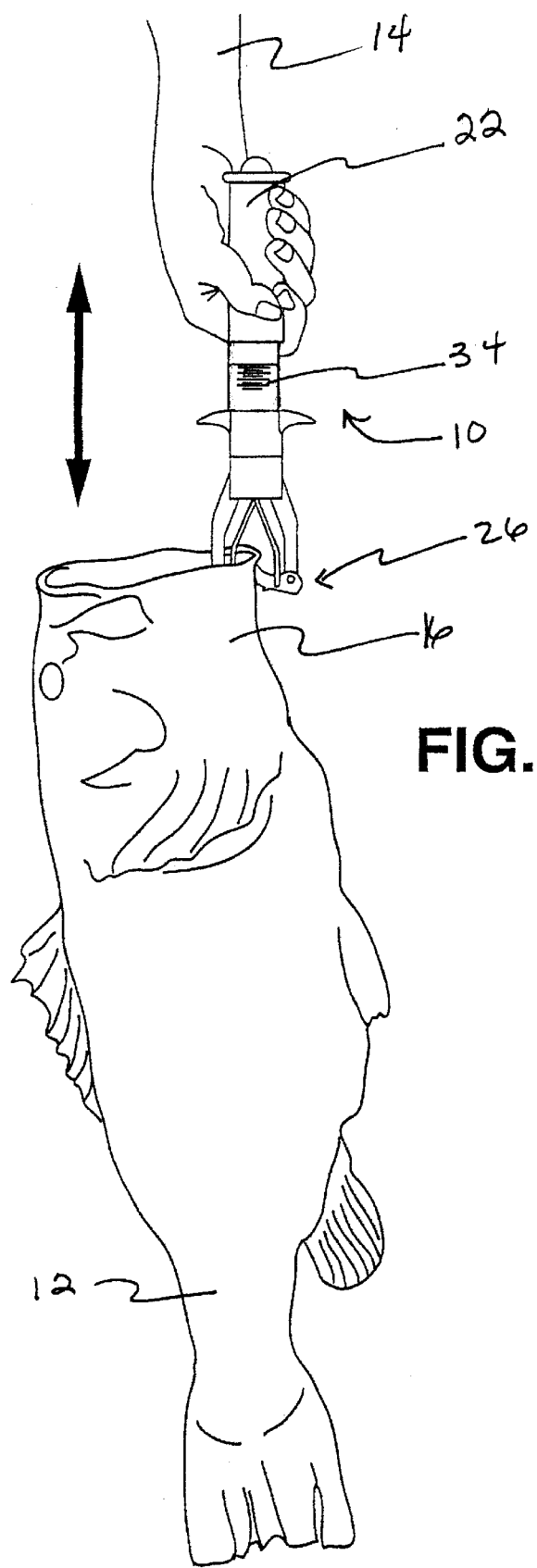
Figure 2:
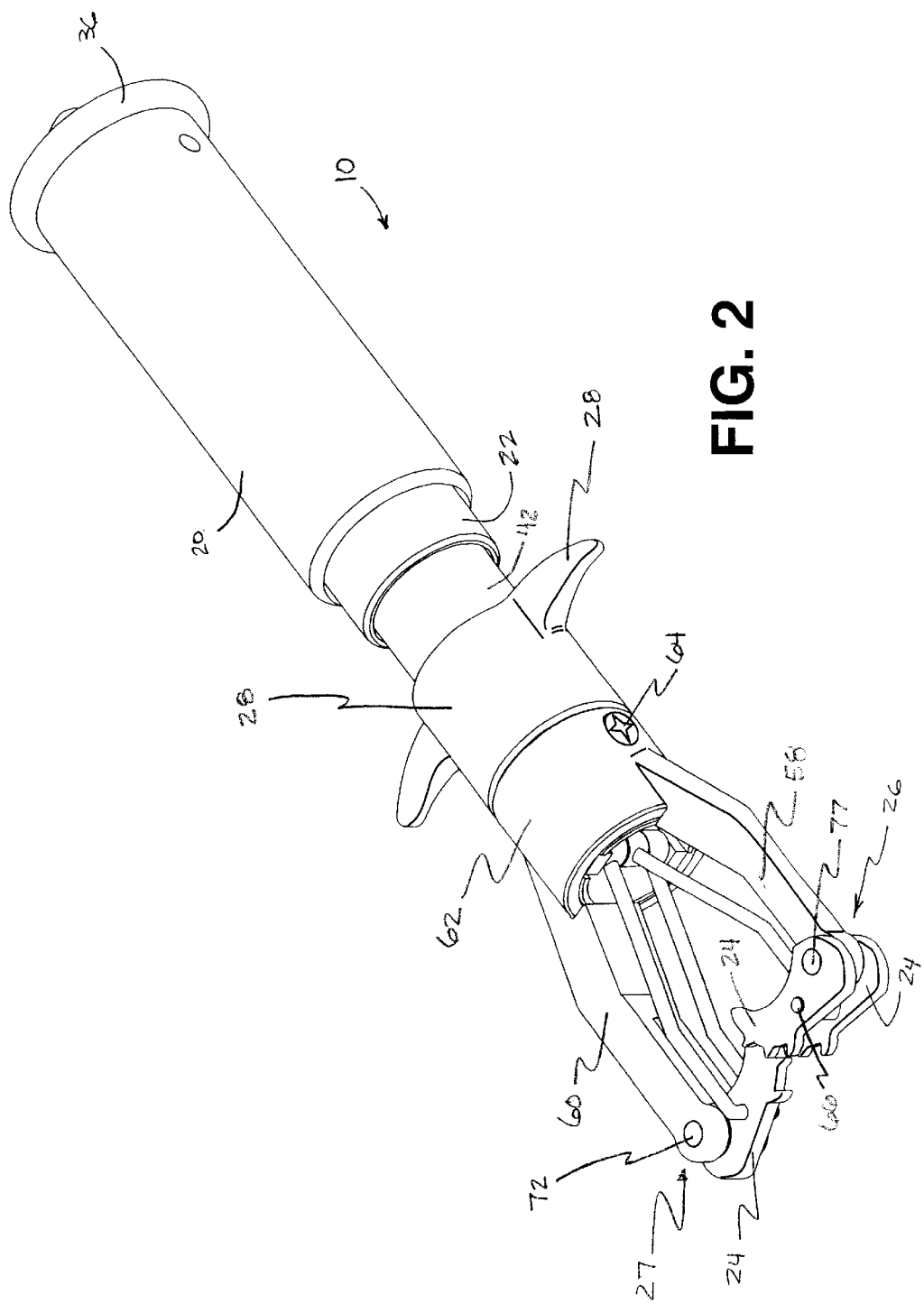
FIG. 2 is a perspective view of an exemplary embodiment of the present invention.

Referring now to FIGS. 1A through 1C, one use of an exemplary embodiment of the handling tool 10 according to the present invention is illustrated in which a fish 12 is grasped and held using tool 10. Holding tool 10 by grip 20 on handle 22, a user 14 places the jaws 24 of tool 10 over the lip or mouth 16 of fish 12. This may be accomplished in one of two ways. As depicted in FIGS. 1A through 1C, user 14 can pull trigger 28 in the direction shown by arrow A so as to open jaws 24 from a closed position depicted in FIG. 1A to the open position depicted in FIG. 1B. Then, by moving tool 10 towards mouth 16 of the fish 12 as depicted by arrow B, mouth 16 is placed in the space between jaws 24. Upon releasing trigger 28, jaws 24 are released and rotate towards the closed position so as to secure or lock mouth 16 between jaws 24 as shown in FIG. 1C. Alternatively, jaws 24 may simply be pushed onto the mouth 16 (in the direction of arrow B), whereby jaws 24 will give slightly so at to rotate about pivoted connections 26, 27 and thereby secure mouth 16 between jaws 24. Using either method, mouth 16 can be locked between jaws 24.

As fish 12 is now secured between jaws 24, fish 12 can be held while a hook is removed, pictures are taken, or otherwise. Furthermore, for the exemplary embodiment depicted, tool 10 can also now be used to determine the weight of fish 12. By holding tool 10 by grip 20, handle 22 slides upwardly against the force of a spring located in tool 10 (as will be described). For a given spring force, the weight of the fish will determine the number of indicators 34 displayed as handle 10 moves away from trigger 28. The indicators can be premarked in pounds, kilograms, and other units and thereby provide for determining the weight of fish 12.

While a use of one exemplary embodiment of the present invention has been described using a fish, it should be understood that the present invention is not limited to use only with fish and may be used to grasp and hold a variety of different objects as will be understood by one of ordinary skill in the art using the teaching disclosed herein. Furthermore, while certain exemplary embodiments of the present invention may be used to weigh objects, the present invention is not limited to embodiments used for weighing.

Referring now to FIGS. 2 and 4A through 4C, an exemplary embodiment of handling tool 10 includes grip 20 on handle 22. As tool 10 may get wet during use, grip 20 provides a slip resistant surface. Grip 20 may be made out of a variety of different materials including wood, plastics, and rubber. Alternatively, a textured surface or other features may be added directly to the surface of handle 22. To provide further security against dropping the tool into the water or otherwise during use, handle cap 36 is provided with an aperture 38 through which a lanyard or rope may be placed. During use, for example, the lanyard can be placed around the user's hand or wrist.

The internal construction of the exemplary embodiment of tool 10 will now be described with FIG. 3 providing an exploded drawing of the assembly and FIGS. 4 though 5 illustrating certain details as will be discussed. Jaws 24 are pivotally connected to an actuator 40 that is in turn pivotally connected to trigger 28. For this exemplary embodiment, actuator 40 is constructed as a forked extension from the interior of cylindrically-shaped main body 42 through an aperture 44 defined by one end of main body 42. Actuator 40 includes a double arm extension 46 and a single arm extension 48 that together are connected to trigger 28 using pin 50. A pair of apertures 52 and aperture 56, both defined in actuator 40, and aperture 54, defined in trigger 28, provide for the receipt of pin 50.

Jaws 24 are connected to both frame 62 and to actuator 40. Frame 62 defines a first arm 58 and second arm 60, each of which extend longitudinally from main body 42. Frame 62 is connected to main body 42 by a pair of screws 64 that extend through a pair of apertures 66 in frame 62 and into another pair of threaded apertures 68 in main body 42. As will be described, actuator 40 is movable with respect to frame 62 so at to pivot jaws 24.

Each jaw 24 has an aperture 65 for connection to actuator 40. Double-arm extension 46 passes though aperture 65 securing one jaw 24. Pin 66 passes through each aperture 65 of two jaws 24 and aperture 68 at the end of single arm extension 48 so as to secure a pair of jaws 24 to actuator 40. Similarly, each jaw 24 has an aperture 70 for connection to frame 62. Pin 72 secures a jaw 24 into a slot 74 that is defined by second arm 60 of frame 62. Pin 72 is placed through aperture 70 and a pair of apertures 76 located proximate the end of second arm 60. Similarly, pin 77 secures a pair of jaws 24 to first arm 58 by being secured through apertures 70, located in each jaw 24, and through aperture 78 located proximate first arm 58. It should be understood that the present invention is not limited to the use of three jaws in the combination shown in the figures; instead, multiple combinations fall within the claims as set forth below and as will be understood by one of ordinary skill in the art.

Trigger 28 defines an extension 80, which provides for connection to actuator 40, and defines a cylindrical outer frame 81 with a pair of finger grips 84. The narrow profile of extension 80 allows it to fit within and between a pair of slots 82 formed at an end of main body 42, while cylindrical outer frame 81 that remains on the outside of main body 42. During operation of trigger 28, the movement of trigger 28 is confined to longitudinal movement along main body 24 as extension 80 slides back and forth along pair of slots 82 and outer frame 81 rides along the exterior of main body 24.

Concealed within main body 42, spring 86 operates to urge or bias trigger 28 along main body 42 towards frame 62. One end of spring 86 rests on an annular, recessed surface 88 formed on the rear of extension 80. The other end of spring 86 rests on footing 90, which is held in place relative to main body 42 by a retaining ring 92 that fits into a groove 94 located along the interior wall of main body 42.

Figure 5A:
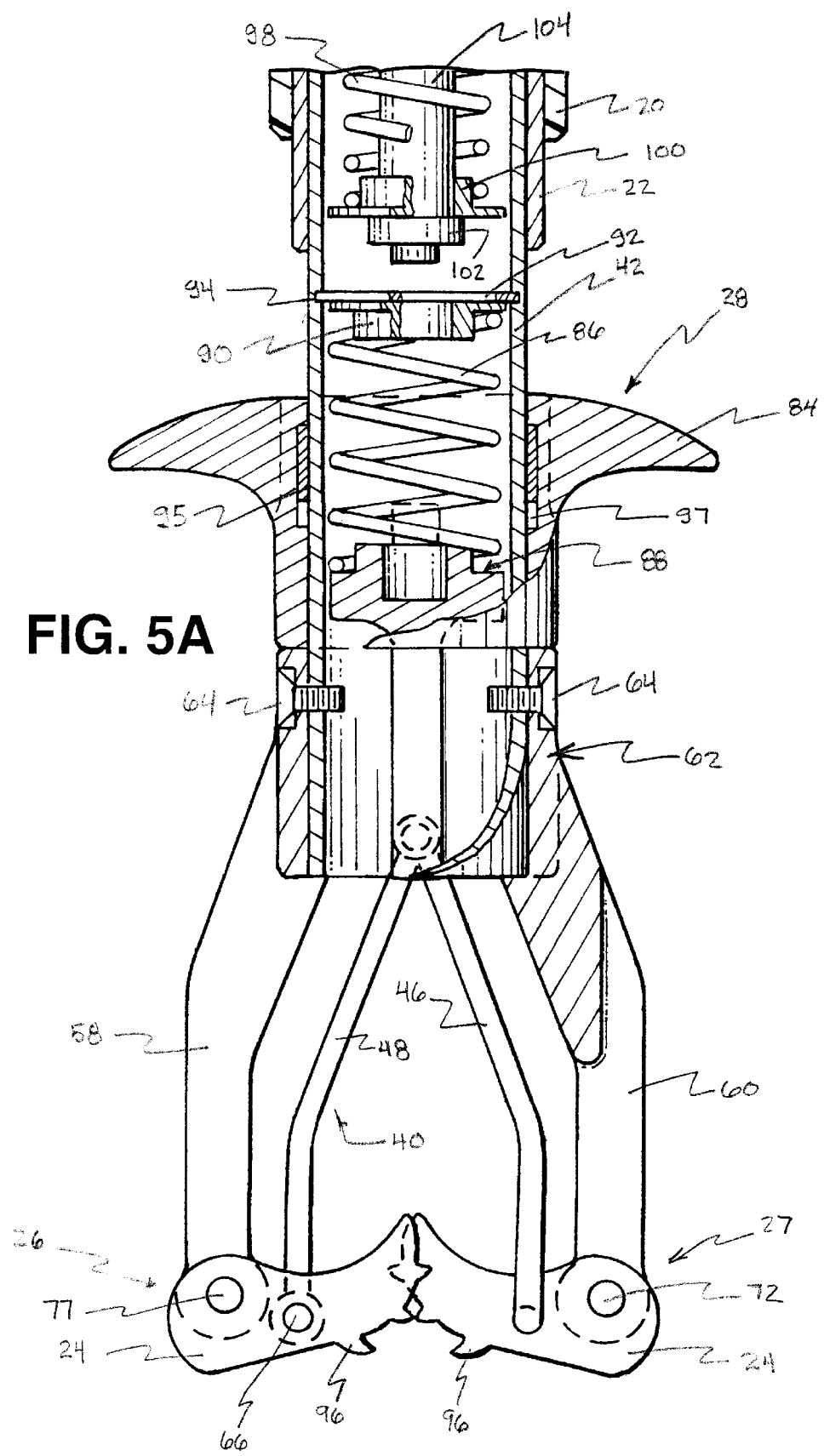
FIGS. 5A and 5B are cross-sectional views illustrating operation of part of an exemplary embodiment of the present invention.
Figure 5B:
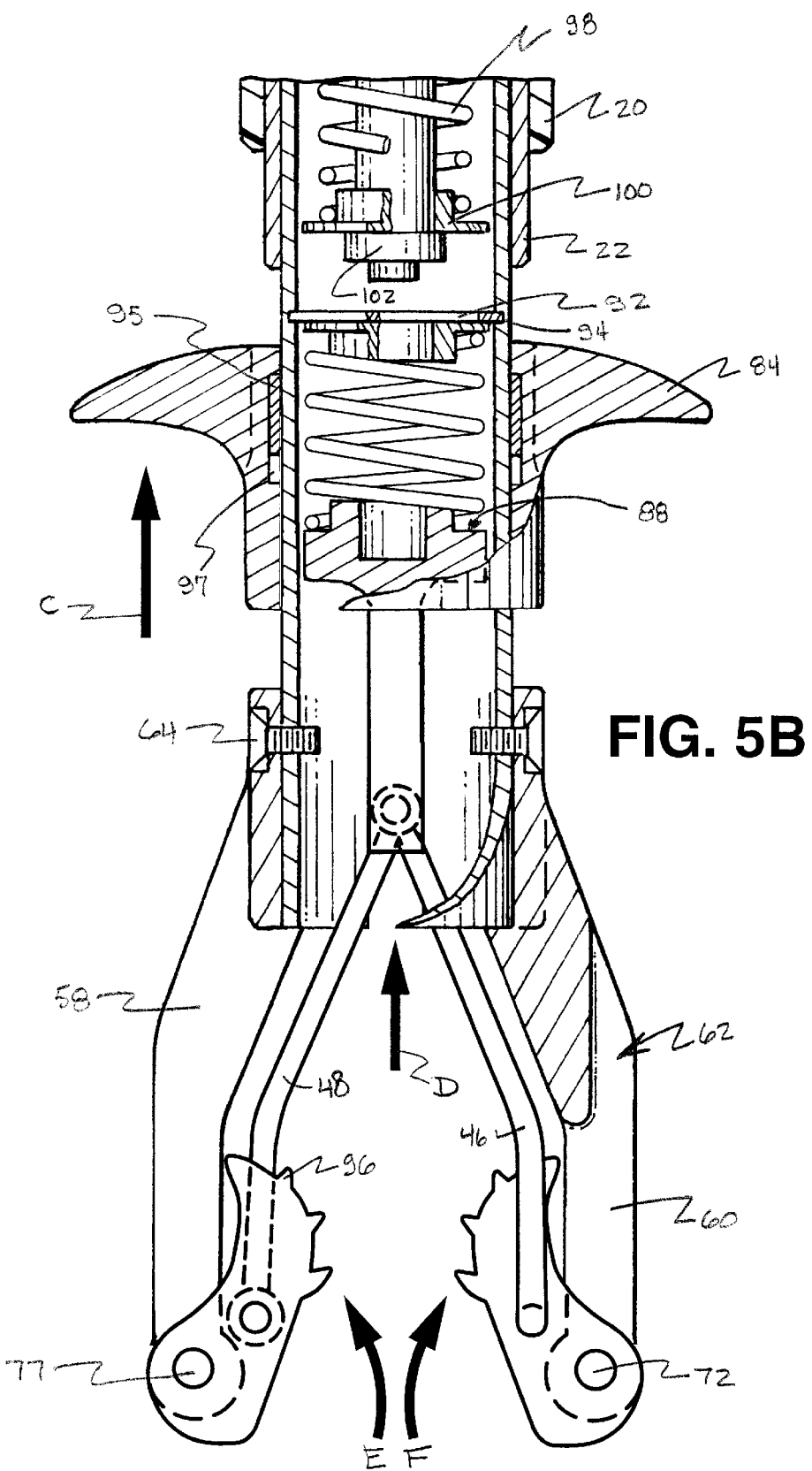

Referring specifically to FIGS. 5A and 5B, the actuation of jaws 24 of handling tool 10 is as follows. Upon causing trigger 28 to move relative to main body 42 in the direction shown by arrow C, actuator 40 is lifted (shown by arrow D) as trigger 28 moves within slots 82. In turn, actuator 40 pulls upon jaws 24 causing jaws 24 to pivot about connections 26 and 27 by rotating about pins 72 and 77. Accordingly, jaws 24 move away from each other (away from the closed position illustrated in FIG. 5A) as shown by arrows E and F and towards the open position shown in FIG. 5B, thereby providing a place for the insertion of an object such as the jaw 16 or lip of a fish (or the release of an object already being held).

As trigger 28 is lifted, spring 86 is compressed between recessed surface 88 and footing 90. Upon releasing trigger 28, the compression of spring 86 provides a force that biases trigger 28 back towards its original position against frame 62. In turn, actuator 40 also moves in a direction longitudinally away from main body 42 and thereby pivots jaws 24 towards each other so as to grasp an object placed between the jaws 24 or to return jaws 24 to the closed position depicted in FIG. 5A. Teeth 96 are provided along one edge of each of jaws 24 to assist with gripping various objects. Such are shown be way of example only; other features may be provided, such as texturing, to assist the gripping ability of jaws 24.

Bushing 95 rests within an oversized groove 97 formed along the interior wall of main body 42. During operation of tool 10, as trigger 28 slides along the exterior of main body 42, bushing 95 helps reduce the friction between moving parts to give a more fluid motion and also helps to reduce rattling or other noise that might be created. While it will be understood using the teachings disclosed herein that numerous materials could be used, it is preferred that bushing 95 be made of plastic or other material that reduces friction.

Features such as the arcuate shape of jaws 24, their location relative to one another, and the pivoting action of jaws 24 all provide for a locking action upon an object held by tool 10. More specifically, as more longitudinal force is applied to pull an object grasped between jaws 24 away from main body 42, more force will be applied to hold the object because the jaws 24 will attempt to rotate more towards each other (i.e. the closed position of FIG. 5A) thereby applying further pressure to an object placed between the jaws. For anglers, this unique action provides a secure tool 10 for grasping a fish.

It should be understood that placing an object between jaws 24 does not necessarily require the user to lift trigger 28 by depressing finger grips 84. Instead, an object may be placed betweens jaws 24 with a force sufficient to overcome the bias provided by spring 86. The object will remain locked between jaws 24 until trigger 28 is depressed to place jaws 24 into the open position as described above.

Figure 3:
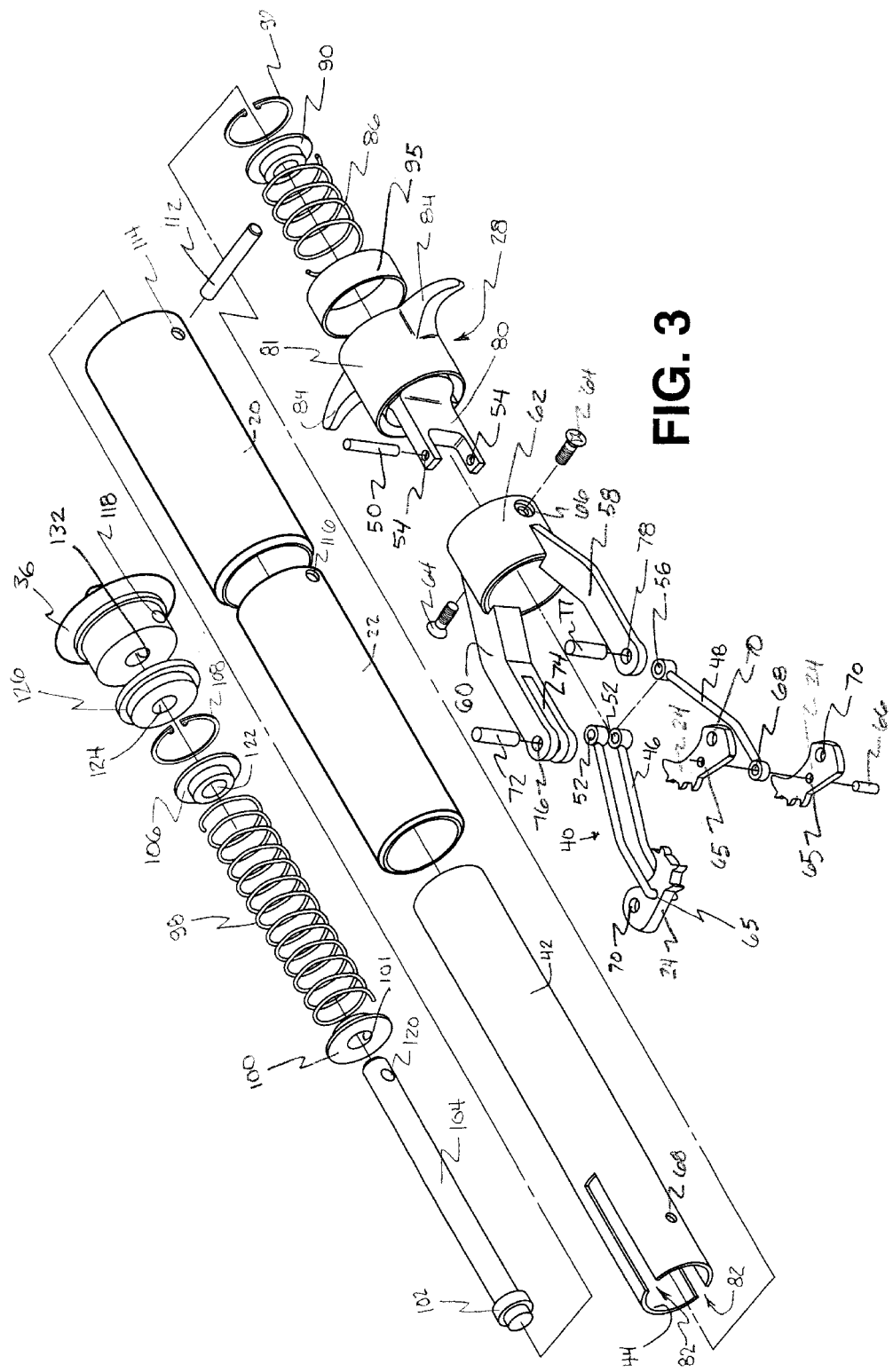
FIG. 3 is an exploded view of an exemplary embodiment of the present invention.

Referring now to all figures, but particularly FIGS. 3 and 4, handling tool 10 is equipped with a weigh spring 98 that allows the user to weigh an object held between jaws 24. One end of weigh spring 98 rests on footing 100, which in turn is secured by ring 102 fixed on the end of spring rod 104. The other end of weigh spring 98 rests on footing 106, which in turn is secured by retaining ring 108 that fits into a groove 110 formed in the interior of main body 42. Spring rod 104 passes through aperture 101 in footing 100, aperture 122 in footing 106, aperture 124 in guide 126, and into a hole 132 in handle cap 36. Spring rod 104 is also attached to handle cap 36 by a pin 112 that passes through a pair of apertures 114 and 116 in handle grip 20 and handle 22 respectively, a pair of holes 118 in handle cap 36, and also a hole 120 in the end of spring rod 104.

Figure 4C:
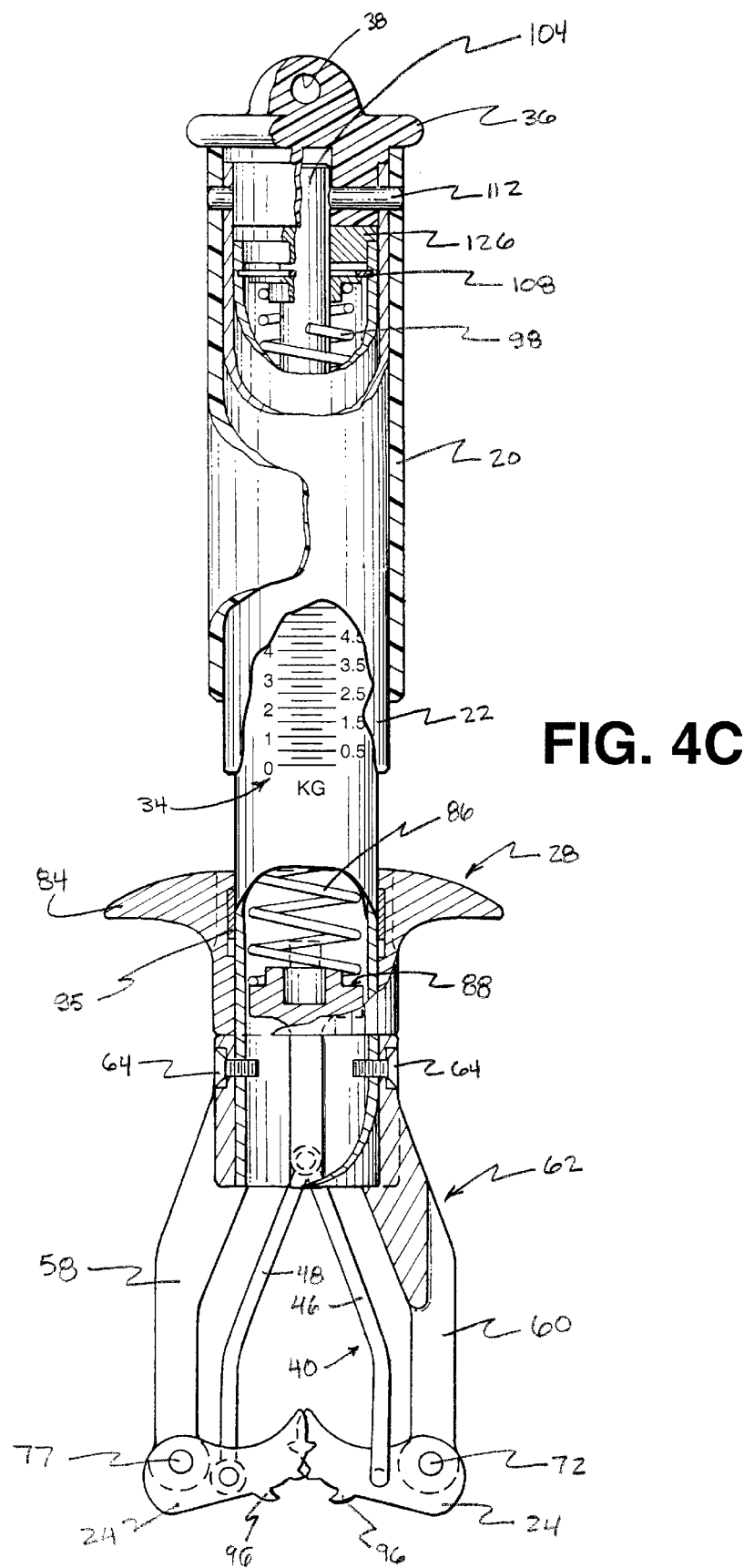

Accordingly, upon grasping a fish 12 or other object between jaws 24 and suspending tool 10 by its handle 22 or grip 20 (as illustrated in FIGS. 1A though 1C), spring 98 is compressed by the weight of the object as it pulls main body 42 relative to handle 22. More specifically, if handle 22 is held upright so that tool 10 is vertically oriented as shown in FIG. 1C, main body 42 and handle 22 move away from each other longitudinally, which in turn causes spring rod 104 to slide through aperture 122 in footing 106 and aperture 124 in guide 126. As a result, the weight of the object held is transferred into the compression of spring 98. As shown in FIGS. 4B and 4C, as handle 22 moves relative to main body 42, the weight of the object held is displayed as weight indicators 34 are uncovered by handle 22 to reveal the weight of the object in pounds, kilograms, or any other units that might be preferred. Once the weight of an object is no longer supported by main body 42 through jaws 24, spring 98 retracts handle 22 back to its original position and indicators 34 no longer display a weight.

It should be appreciated by those skilled in the art that modifications and variations can be made to the exemplary embodiment of handling tool 10 as described herein, without departing from the scope and spirit of the claims. By way of example only, embodiments of the present invention may be provided with electronic scales for the weighing and reporting of an object grasped with this tool. It is intended that the invention include such modifications and variations as come within the scope of the appended claims and their equivalents.

What is claimed is:

1. A tool for grasping objects, comprising:
   a housing having an interior and an exterior, a first end and a second end;
   a pair of support arms located at the first end of said housing and extending longitudinally away from said housing, said support arms being non-movable relative to said housing;
   jaws pivotally connected to said pair of support arms at respective pivot points, said jaws having respective gripping surfaces on outer side edges thereof;
   a trigger located upon said housing and configured for longitudinal movement along said housing; and
   an actuator extending longitudinally from said interior of said housing and movable longitudinally between said pair of support arms, said actuator connected to said trigger and pivotally connected to said jaws, and configured such that upon causing said trigger to move away from the first end of said housing, said jaws movable to an open position by pivoting inwards within said support arms towards said first end of said housing such that said gripping surfaces are spaced apart and facing within said support arms in said open position of said jaws.

2. A tool for grasping objects as in claim 1, further comprising:
   a handle located proximate to the second end of said housing and configured for longitudinal movement along the exterior of said housing; and
   a spring located within the interior of said housing and connected to said handle and said housing, said spring being configured to oppose the movement of said handle along said housing and so as to provide for weighing of the objects grasped by the tool.

3. A tool for grasping objects as in claim 1, wherein said jaws each include teeth located along at least one edge to assist in securing an object between said jaws.

4. A tool for grasping objects as in claim 1, wherein at least one of said support arms defines a slot for the receipt of one of said jaws.

5. A tool for grasping objects as in claim 1, wherein said housing defines a pair of slots located along said first end of said housing for guiding the longitudinal movement of said spring-biased trigger.

6. A tool for handling fish, comprising:
   a cylinder having a pair of slots formed at one end, said cylinder defining an interior and an exterior,
   a frame attached to the exterior of said cylinder, located proximate said pair of slots, and extending longitudinally from said cylinder;
   jaws pivotally connected at respective pivot points to a non-movable end of said frame, said jaws having respective gripping surfaces on outer side edges thereof;

a trigger located upon said cylinder and configured for guided movement along said pair of slots;

a spring located within the interior of said cylinder and configured for urging said trigger along said pair of slots towards said frame; and an actuator extending longitudinally from the interior of the slotted end of said cylinder, said actuator being attached directly to said jaws and said trigger and configured such that upon causing said trigger to move along said pair of slots against said spring, said jaws move to an open position by pivoting inwards between said pivot points towards said pair of slots such that in said open position of said jaws, said gripping surfaces are spaced apart and facing at a location between said pivot points and said pair of slots.

7. A tool for handling fish as in claim 6, further comprising:

a cylindrically shaped handle located along the exterior of said cylinder and configured for movement longitudinally along said cylinder;

a spring located within the interior of said cylinder, said spring providing mechanical communication between said handle and said cylinder, said spring being configured for resisting the movement of said handle away from the slotted end of said cylinder; and a series of indications located along the exterior of said cylinder and positioned such that as said handle is moved along said cylinder, the weight of a fish retained by said jaws is displayed.

8. A tool for handling fish as in claim 7, wherein said frame is comprised of a first arm and a second arm, each extending longitudinally away from said cylinder, said first arm having at least two of said jaws pivotally connected thereto, said second arm having at least one of said jaws pivotally connected within said second arm.

9. A tool for handling fish as in claim 8, wherein said jaws each have teeth located along at least one edge.

10. A tool for handling fish as in claim 9, wherein said actuator is pivotally connected to said trigger and pivotally connected to said jaws.

11. A tool for holding objects, comprising;

a cylindrically-shaped main body defining an interior, exterior, and a first and second aperture located respectively at each end of said main body, said main body also defining a pair of non-movable arms that extend longitudinally and are located proximate said first aperture;

clamping jaws connected at respective connection points to the ends at said pair of arms and configured for pivoting inward of said respective connection points between said arms towards said first aperture about the point of connection to said pair of arms, said jaws having respective gripping surfaces on outer side edges thereof;

means, extending longitudinally between said pair of arms and connected directly to said clamping jaws, for selectively causing said clamping jaws to pivot about their respective point of connection to said arms so as to secure or release an object;

said jaws pivotally movable to an open position wherein said gripping surfaces are spaced apart and facing at a location within said arms;

a handle located along said main body proximate to said second aperture; and a spring providing mechanical communication between said main body and said handle, and biased against the movement of said handle away from the clamping jaws along said main body;

whereby upon holding an object between said clamping jaws and suspending the tool by said handle, the weight of the object causes said main body to move away from said handle against the bias provided by said spring such that the relative movement of the main body is a function of the weight of the object.

12. A tool for holding objects as in claim 11, wherein said pair of arms defines a first arm and a second arm, said first arm having at least two of said clamping jaws pivotally connected thereto, said second arm having at least one of said clamping jaws pivotally connected thereto.

13. A tool for holding objects as in claim 12, wherein said clamping jaws each include at least one edge having means for resisting the removal of the object from within the clamping jaws.

14. A tool for holding objects as in claim 11, wherein said means connected to said clamping jaws extends from said first aperture of said cylindrically shaped main body.

15. A tool for holding objects as in claim 11, further comprising a series of weight indications located upon said exterior of said main body, said indications configured for displaying the weight of an object held by said clamping jaws whenever the tool is suspended vertically using said handle.

* * * * *